Patented June 28, 1932

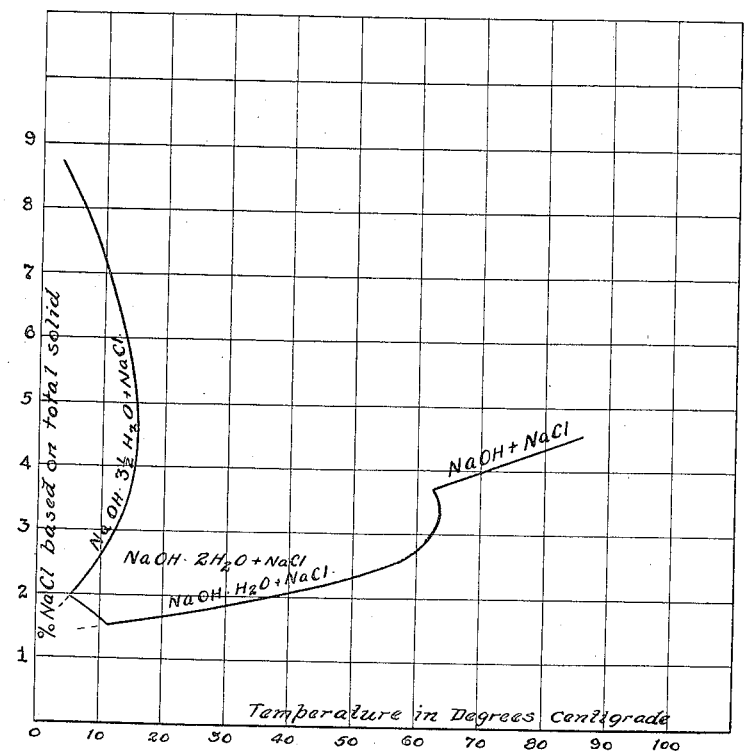

1,865,281

UNITED STATES PATENT OFFICE

ALBERT KELVIN SMITH, OF CLEVELAND, OHIO, ASSIGNOR TO THE DOW CHEMICAL COMPANY, OF MIDLAND, MICHIGAN, A CORPORATION OF MICHIGAN

PROCESS OF SEPARATING CAUSTIC SODA AND SODIUM CHLORIDE

Application filed June 2, 1928. Serial No. 282,335.

This invention relates more particularly to the separation of sodium hydroxide and sodium chloride; and it is among the objects of the invention to provide a process of efficient character without unduly adding to the cost. Other objects and advantages will appear as the description proceeds.

To the accomplishment of the foregoing and related ends, the invention, then, consists of the features hereinafter fully described, and particularly pointed out in the claims, the annexed drawing and the following description setting forth in detail but a few of the various ways in which the principle of the invention may be employed.

In said annexed drawing:

The single figure there appearing is a chart showing the mutual solubility curves of NaOH and NaCl at various temperatures.

In accordance with my invention sodium hydroxide is separated out from a water solution in which the sodium chloride content relative to the hydroxide is low. The separation is done by crystallizing the hydroxide as a hydrate from such a solution, unsaturated, however, with sodium chloride. This is accomplished by first preparing a solution of suitably low chloride content by concentration and subsequent cooling. Such solution, following one procedure, is then diluted to a concentration which upon cooling becomes saturated with respect to a hydrate of the hydroxide and not saturated with respect to the chloride, and on further abstraction of heat, the hydroxide is crystallized out of the solution. Such abstraction of heat may be continued until the sodium chloride content of the mother liquor rises nearly to the saturation point at the temperature of working. The heat abstracted is the heat of fusion of the hydrate and the temperature remains practically constant during the crystallization step.

Although adapted to the working of any caustic soda solution containing chloride, my invention is particularly applicable to obtaining an hydroxide of high purity from a weak electrolytic cell effluent. Such effluents contain a relatively high ratio of chloride to hydroxide. The chloride, upon concentration, salts out, but the ratio of chloride to hydroxide in the concentrated liquor is still relatively high compared with the ratio obtainable by my method.

From the chart constituting the figure of the drawing it is seen that there is a decided minimum ratio of sodium chloride to sodium hydroxide in solutions saturated with both which is obtained at or near a temperature of 15° C., that is, a mutually saturated solution of these two substances at or near that temperature will contain them in the minimum ratio of chloride to hydroxide. It is accordingly advantageous as a starting point to first reduce the ratio to approximately the minimum amount by cooling a saturated solution to the optimum temperature.

For instance, a solution containing sodium hydroxide and sodium chloride in any amount may be concentrated to a NaOH content of about 51%, then cooled to 15° C., and filtered to remove the NaCl salted out. The filtrate will then have the composition of approximately 51% NaOH and 0.8% NaCl, or 1.5% NaCl based on the total solids. If now this solution obtained to such ratio be diluted to 39% NaOH and again cooled to 15° C., the solution becomes saturated with respect to $NaOH.3\frac{1}{2}H_2O$. The crystals and the solution will therefore have the same composition, and on further removal of heat, the crystallization will continue at the same temperature. However, when the percentage of NaCl in the solution, based on the total solids increases to about 4.5, NaCl will begin to crystallize out with the $NaOH.3\frac{1}{2}H_2O$. This point is not reached until the ratio of crystals to mother liquor is about 2 to 1. It is more practicable to separate crystals from mother liquor when the mixture is about one-half crystals; there is then less danger of including the NaCl. It is preferable, therefore to cease withdrawing heat and crystallizing out the hydrated hydroxide before the high ratio of 2 to 1 above referred to is reached, that is to stop when that ratio is at or about 1 to 1.

The mother liquor may be returned into the first step of the process in continuous operaiton, or mixed with the original feed solution before concentration to 51% NaOH for salting out further chloride. The crystals may be washed with a small amount of water, or preferably with melted

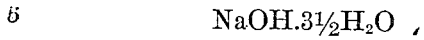
NaOH.3½H₂O , from a previous yield. The amount of NaCl carried over with the crystals will depend then upon the completeness of separation from the mother liquor, and the amount of washing. It can thus be reduced to very small minimum.

Along the same general lines, it is also feasible to crystallize at higher temperatures and concentrations, and this is of advantage where it is desired to avoid adding additional water and the consequent cost of vaporization, also the cost of refrigeration which would be necessary in summer weather. Accordingly the solution prepared as above to contain about 51% NaOH and 0.8% NaCl may be further concentrated to about 69% NaOH without separating out more salt, then be cooled to about 64° C., and about one-half of the NaOH be thereby crystallized out as NaOH.H₂O without crystallizing out NaCl. As a practical case, a solution containing 1.8% NaCl based on total solid, may have about one-third of the NaOH crystallized out as NaOH.H₂O from a solution containing about 69%. The mother liquor may be returned into the first step, in continuous operation, or mixed with the dilute solution being concentrated to 51% and the NaCl surplus be removed by cooling. If the NaOH.H₂O crystals be not washed, and they carry about 10% of mother liquor by weight for instance, the finished product thus obtained would have a sodium chloride content derived from mother liquor amounting to only .26 per cent. In case it is desired to make a product more nearly chloride-free, melted crystals of NaOH.H₂O from a previous yield may be used to wash out the mother liquor and eliminate this contamination. This merely results in an increase of the amount of mother liquor requiring recirculation.

The procedure may be varied as indicated by the foregoing examples without departing from my invention, change being made as to either the extent of concentration or cooling or both and with or without dilution as described, provided that the alkali be separated from the contaminating salt by crystallizing it out in the form of a hydrated hydroxide by abstraction of heat from a solution without material cooling, such solution being saturated with respect to the particular hydrated form so separated but unsaturated with respect to the salt.

Other modes of applying the principle of the invention may be employed, change being made as regards the details disclosed, provided the steps stated by any of the following claims, or the equivalent of such, be employed.

I therefore particularly point out and distinctly claim as my invention:—

1. In a process of separating sodium hydroxide and sodium chloride, the steps which consist in preparing a solution having about 69% of sodium hydroxide and a small proportion of sodium chloride, cooling to about 64° C., and separating the crystals of NaOH.H₂O thereby formed.

2. The process of making sodium hydroxide of high purity from a solution thereof containing sodium chloride which comprises providing a solution containing about 51% NaOH and substantially saturated with respect to NaCl at 15° C., concentrating such solution by evaporating to a NaOH content of approximately 69%, cooling to approximately 64° C. and separating crystals of NaOH.H₂O thereby formed.

3. The process of making sodium hydroxide of high purity from a solution thereof containing sodium chloride which comprises concentrating such solution to a NaOH content of approximately 51%, cooling to approximately 15° C., filtering off sodium chloride crystals, then concentrating the mother liquor to approximately 69% NaOH content, cooling to about 64° C. and maintaining such temperature until a portion of the NaOH is crystallized as NaOH.H₂O relatively free from inclusion of chloride and separating the crystals from the final mother liquor.

Signed by me this 2nd day of August, 1927.

ALBERT KELVIN SMITH.